(12) United States Patent
Neft

(10) Patent No.: US 9,110,767 B2
(45) Date of Patent: Aug. 18, 2015

(54) COBOL REFERENCE ARCHITECTURE

(75) Inventor: Mark Neft, Caldwell, NJ (US)

(73) Assignee: Accenture Global Services Limited, Dublin (IE)

( * ) Notice: Subject to any disclaimer, the term of this patent is extended or adjusted under 35 U.S.C. 154(b) by 373 days.

(21) Appl. No.: 13/544,601

(22) Filed: Jul. 9, 2012

(65) Prior Publication Data

US 2014/0013337 A1 Jan. 9, 2014

(51) Int. Cl.
| | | |
|---|---|---|
| G06F 3/00 | (2006.01) | |
| G06F 9/44 | (2006.01) | |
| G06F 9/46 | (2006.01) | |
| G06F 13/00 | (2006.01) | |
| G06F 9/54 | (2006.01) | |

(52) U.S. Cl.
CPC .. *G06F 8/72* (2013.01); *G06F 8/74* (2013.01); *G06F 8/75* (2013.01); *G06F 9/546* (2013.01)

(58) Field of Classification Search
None
See application file for complete search history.

(56) References Cited

U.S. PATENT DOCUMENTS

| | | | | |
|---|---|---|---|---|
| 6,904,598 | B2* | 6/2005 | Abileah et al. | 719/319 |
| 8,543,508 | B2* | 9/2013 | Katzin et al. | 705/44 |
| 2006/0101474 | A1* | 5/2006 | Magown | 719/315 |
| 2006/0241961 | A1* | 10/2006 | Tsyganskiy et al. | 705/1 |
| 2009/0007066 | A1 | 1/2009 | Grechanik | |

FOREIGN PATENT DOCUMENTS

| | | |
|---|---|---|
| WO | WO 2007/122640 A2 | 11/2007 |
| WO | WO 2007/122640 A3 | 11/2007 |

OTHER PUBLICATIONS

Huang et al., "Wrapping Legacy Codes for Grid-Based Applications", Apr. 2003, IEEE, "Proceeding of the International Parallel and Distributed Processing Symposium", pp. 1-7.*
Extended European Search Report mailed Sep. 26, 2013 for corresponding European Application No. 13175619.9, 8 pages.

* cited by examiner

*Primary Examiner* — Emerson Puente
*Assistant Examiner* — Kacy Verdi
(74) *Attorney, Agent, or Firm* — Brinks Gilson & Lione

(57) ABSTRACT

The COBOL reference architecture (CRA) system and the transactional workflow driver (TWD) provide an efficient and effective way to extend an existing application using modern architecture techniques without rewriting the existing application. The (CRA) system and TWD provide a way to generate new and interchangeable COBOL language functionality for multiple interactive types (e.g., transaction servers and/or transaction managers) running in various computing environments.

16 Claims, 12 Drawing Sheets

| APPLIED | OPCODE | CHANNEL | SEQIDX | MODULE | ERRORIDX | NEXTIDX | INITMODULE | WRTOUTIND |
|---|---|---|---|---|---|---|---|---|
| LOGEVENT | GTCUINFO | 3270 | 1 | ELMEVP01 | 1 | 2,4 | PAPPLINT | |
| LOGEVENT | GTCUINFO | 3270 | 2 | PFRMTVAL | 1 | 3 | PAPPLINT | |
| LOGEVENT | GTCUINFO | 3270 | 3 | ELMEVP02 | 1 | 4 | PAPPLINT | Y |
| LOGEVENT | GTCUINFO | 3270 | 4 | DONE | | | PAPPLINT | |

FIG. 9

COBOL REFERENCE ARCHITECTURE

1. TECHNICAL FIELD

The present description relates to an efficient and effective way to extend an existing application using modern architecture techniques without rewriting the existing application. More specifically, this description relates to a way to generate new and interchangeable COBOL language functionality for multiple interactive types (e.g., transaction servers and/or transaction managers) running in a computing environment.

2. BACKGROUND

Currently, in order to provide new and/or enhanced functionality to a legacy COBOL application, a developer must modify the legacy application with the new and/or enhanced functionality. Developers find modifying legacy applications difficult to build new COBOL functionality that is consistent with the legacy functionality and interchangeable from one technology to another. Developers lack the tools to enable legacy and new COBOL functionality to be easily reused between interactive types.

SUMMARY

The COBOL reference architecture (CRA) provides a system, method and computer readable medium configured to extend a legacy application in order to generate a desired target application. The CRA system includes a user interface that presents a transactional workflow driver (TWD) that processes a target application processing vector to perform features defined by a target execution pattern identified by the target application processing vector, and visualizes a representation of the legacy application (e.g., using a TWD canvas). A user uses the TWD to identify legacy application processing components and legacy application execution patterns from the visual representation of the legacy application. The legacy application execution patterns are defined by the legacy application processing components. The TWD presents a visual representation of extender processing components and identifies, by comparing the legacy application processing components with the target application (e.g., features and enhancements unavailable in the legacy application), one or more extender processing components from the visual representation of the extender processing components that extend the legacy application. The TWD may also be used to generate target application processing vectors for new applications and present a visual representation of the new processing components for the new applications.

The CRA system and/or the TWD generate the desired target application and/or extender execution patterns defined by the extender processing components. The user and/or the TWD select the one or more extender processing components from an extender processing components repository (e.g., one or more files, databases and/or computer memories). The user and/or the TWD order the one or more extender processing components and the legacy application execution patterns into an execution sequence. The CRA system and/or the TWD generate and store, in a memory coupled to a processor, a target application processing vector (e.g. a new application or extension of a legacy application) that represents the ordering of the legacy application execution patterns with the extender execution patterns. The CRA system and/or the TWD generate the target application processing vector by translating the legacy application processing components and the one or more extender processing components into a target execution pattern. The CRA system and/or the TWD execute, using the processor, the target application processing vector to perform features defined by the target execution pattern.

The CRA system and/or the TWD deploy the target application with one or more service request message application program interfaces (APIs) for one or more transaction servers and/or transaction managers. The transaction servers and/or transaction managers may include: an IBM® WEBSPHERE® message queue (MQ) transaction server; a Customer Information Control System (CICS®) transaction server; an Information Management System (IMS™) transaction server; and a batch transaction manager. The TWD manages user interactions with the target application, using the one or more service request message APIs to satisfy (e.g., process) service request messages responsive to the user interactions.

The CRA system and/or the TWD receive a user interaction for the target application through the one or more service request message APIs, translates the user interaction into a target application service request message for the target application processing vector component associated with the legacy application processing components and the one or more extender processing components, and identifies which of the legacy application processing components or the one or more extender processing components to which to communicate the target application service request message. The TWD communicates the target application service request message to the identified legacy application processing component or the identified one or more extender processing component, executes the identified legacy application processing component or the identified one or more extender processing component responsive to the target application service request message, and receives a return code from the identified legacy application processing component or the identified one or more extender processing component. The CRA system and/or the TWD deploy determine whether the return code includes: a result; or a subsequent processing component reference to another legacy application processing component or another one or more extender processing component.

When the return code includes a result, the CRA system and/or the TWD communicate the return code in a service request response message through the one or more service request message APIs to the user. When the target application service request message is a MQ Get Message from a MQ queue, the CRA system and/or the TWD receive the target application service request message using a MQGet call, and store the result in a service request response message in the MQ queue, and if a MQPut call is needed, communicating the service request response message using a MQPut call. An MQGet call does not necessarily require a reply to result using a MQPut call.

When the target application service request message is a Customer Information Control System CICS® request from a 3270® terminal service, the CRA system and/or the TWD receive the target application service request message using a Basic Mapping Support (BMS®) screen interface, and communicate the result in a service request response message to the 3270® terminal service using the BMS® screen interface.

When the target application service request message is a Customer Information Control System (CICS) request or an Information Management System (IMS™) request from a non-terminal transaction, the target application service request message is stored in a common area. The CRA system and/or the TWD receive the target application service request message using a call to get the common area. The common area is one or more areas of computer memory passed between one or more applications, including the target application and the non-terminal transaction. The CRA system and/or the TWD communicate the result in a service request response message to the non-terminal transaction by storing the service request response message in the common area using a call to put common area.

When the target application service request message is a IMS request from a 3270® terminal service, the CRA system and/or the TWD receive the target application service request message using a screen interface, and communicate the result in a service request response message to the 3270 terminal service using the screen interface.

When the target application service request message is a batch transaction request message from a batch transaction, the CRA system and/or the TWD receive the target application service request message using open files connected to a database, wherein the target application service request message is stored in the open files connected to the database, and communicate the result in a service request response message to the batch transaction by storing the service request response message in a common area using a call to put common area.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The COBOL reference architecture (CRA) system and the transactional workflow driver (TWD) may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 9 shows another decision matrix table.

DETAILED DESCRIPTION

Figure 1:
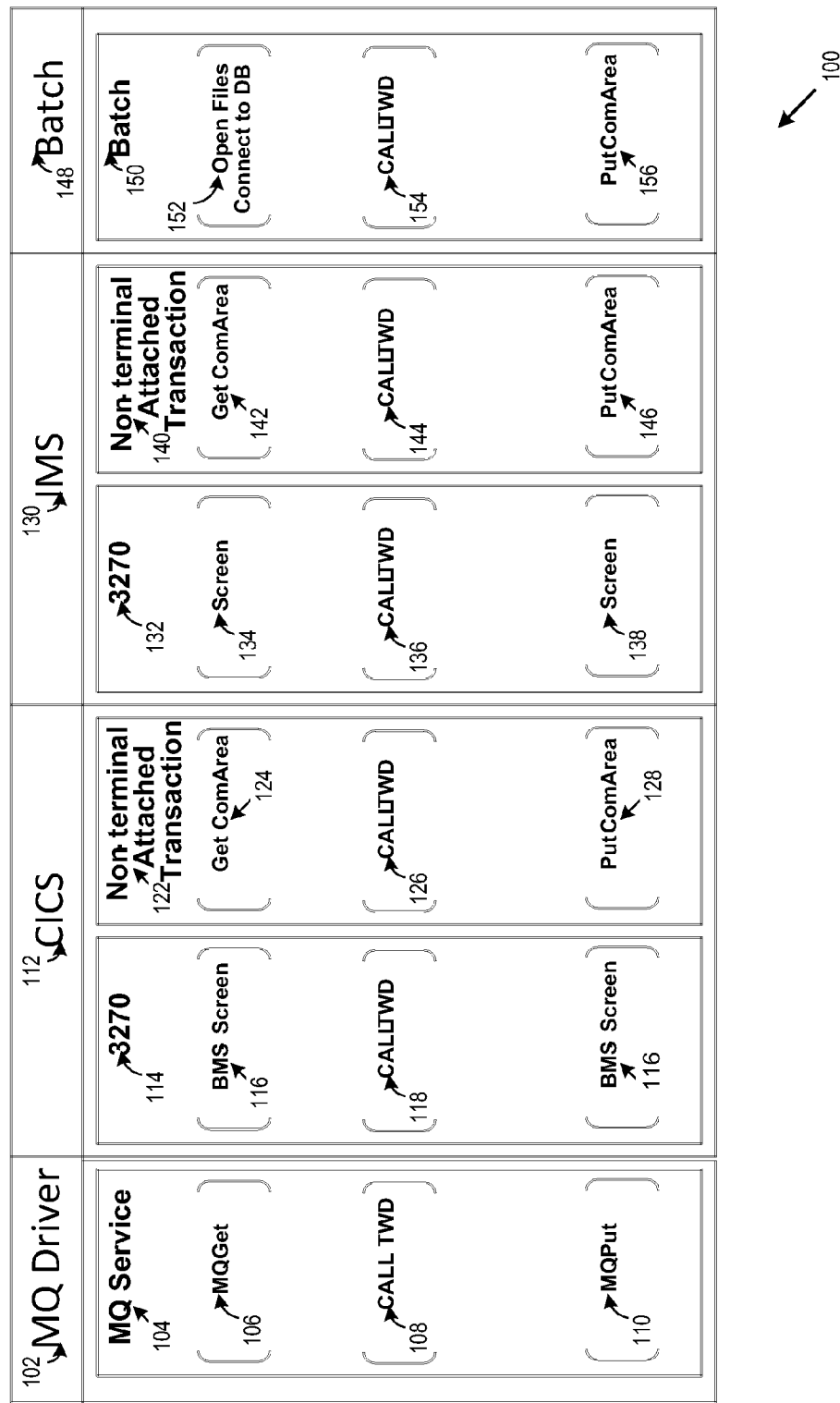
FIG. 1 shows the COBOL reference architecture (CRA).

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

The COBOL reference architecture (CRA) provides a system, method and computer readable medium configured to create (generate) new applications and extend a legacy application with enhancements, and generate desired target applications (e.g., new and/or extended applications). Also, the CRA system may generate new applications quickly and efficiently. The CRA system includes a user interface that presents a transactional workflow driver (TWD) to visualize a representation of the legacy application. A designer (developer) uses the TWD to identify legacy application processing components and legacy application execution patterns from the visual representation of the legacy application. The legacy application execution patterns are defined by the legacy application processing components. The TWD presents a visual representation of extender processing components and identifies, by comparing the legacy application processing components with the target application (e.g., features and enhancements unavailable in the legacy application), one or more extender processing components from the visual representation of the extender processing components that extend the legacy application. The TWD generates the desired target application and extender execution patterns defined by the extender processing components. The user and/or the TWD select the one or more extender processing components from a extender processing components repository (e.g., one or more files, databases and/or computer memories). The user and/or the TWD order the one or more extender processing components and the legacy application execution patterns into an execution sequence. The TWD generates and stores in a memory (e.g., cache) a target application processing vector that represents the ordering of the legacy application execution patterns with the extender execution patterns (e.g., for new applications, the target application processing vector represents the ordering of new application execution patterns). The TWD generates the target application processing vector by translating the legacy application processing components and the one or more extender processing components into a target execution pattern. The TWD executes, using the processor, the target application processing vector to perform features defined by the target execution pattern. The target application processing vector defines the target application logic flow, and branching and conditional logic for the target application. The target application processing vector may include one or more other processing vectors (so that a vector may comprise multiple sub-vectors, whereby vectors call and/or cause other vectors to be invoked). The TWD provides branching and conditional logic so that a target application may be defined by a single TWD vector. The TWD branching and conditional logic may be used, for example, to perform field validation allowing the TWD to call a module (processing component) repeatedly and use different data (e.g., defined at runtime) with the module (e.g., validating multiple account numbers where each account is validated based on different criteria). The TWD uses pointers, passes an address pointer to an array of copy books (used by one or more TWD vectors) to the working storage variables stored in a global memory area.

The target application processing vector defines functions that may run in parallel by evaluating a parallel processing variable (attribute for example with a value of 'Y' or 'N') that indicates whether to execute a processing component. When the parallel processing variable indicates a processing component may be executed in parallel, the TWD creates a thread for the processing component and calls (executes) the processing component. The TWD evaluates the parallel processing variable for each successive processing component and creates a processing thread for each the processing components and calls (executes) the respective processing component. When the TWD evaluates the parallel processing variable of a successive processing component as non-parallel (e.g., attribute value of 'N'), the TWD waits for the one or more threads to compete (e.g., when a counting semaphore equals zero) before calling the non-parallel processing component (e.g., using the counting semaphore to track how many threads are running). The TWD also may evaluate the return codes before calling the non-parallel processing component. The TWD increases the counting semaphore for each thread created and decrements for each thread that completes. The TWD may automatically analyze the processing components of the target application and identify those processing components that the TWD may execute in parallel.

The CRA system and/or the TWD deploy the target application with one or more service request message application program interfaces (APIs) for one or more transaction servers and/or transaction managers. The transaction servers and/or transaction managers may include: a WEBSHERE® message queue (MQ) transaction server; a Customer Information Control System (CICS®) transaction server; an Information Management System (IMS™) transaction server; and a batch transaction manager. The TWD manages user interactions with the target application, using the one or more service request message APIs to satisfy service request messages responsive to the user interactions.

The CRA system and/or the TWD receive a user interaction for the target application through the one or more service request message APIs, translates the user interaction into a target application service request message for the target application processing vector component associated with the legacy application processing components and the one or more extender processing components, and identifies which of the legacy application processing components or the one or more extender processing components to which to communicate the target application service request message. The TWD communicates the target application service request message to the identified legacy application processing component or the identified one or more extender processing component, executes the identified legacy application processing component or the identified one or more extender processing component responsive to the target application service request message, and receives a return code from the identified legacy application processing component or the identified one or more extender processing component. The CRA system and/or the TWD deploy determine whether the return code includes: a result; or a subsequent processing component reference to another legacy application processing component or another one or more extender processing component.

When the return code includes a result, the CRA system and/or the TWD communicate the return code in a service request response message through the one or more service request message APIs to the user. When the target application service request message is a MQ Get Message from a MQ queue, the CRA system and/or the TWD receive the target application service request message using a MQGet call, and store the result in a service request response message in the MQ queue by communicating the service request response message using a MQPut call.

When the target application service request message is a CICS® request from a 3270® terminal service, the CRA system and/or the TWD receive the target application service request message using a Basic Mapping Support (BMS®) screen interface, and communicate the result in a service request response message to the 3270® terminal service using the BMS® screen interface.

When the target application service request message is a CICS® request or an IMS™ request from a non-terminal transaction, the target application service request message is stored in a common area. The CRA system and/or the TWD receive the target application service request message using a call to get the common area. The common area is one or more areas of computer memory passed between one or more applications, including the target application and the non-terminal transaction. The CRA system and/or the TWD communicate the result in a service request response message to the non-terminal transaction by storing the service request response message in the common area using a call to put common area.

When the target application service request message is a IMS™ request from a 3270® terminal service, the CRA system and/or the TWD receive the target application service request message using a screen interface, and communicate the result in a service request response message to the 3270® terminal service using the screen interface.

When the target application service request message is a batch transaction request message from a batch transaction, the CRA system and/or the TWD receive the target application service request message using open files connected to a database, wherein the target application service request message is stored in the open files connected to the database, and communicate the result in a service request response message to the batch transaction by storing the service request response message in a common area using a call to put common area.

FIG. 1 shows the COBOL reference architecture (CRA) 100. The CRA system uses the COBOL reference architecture (CRA) 100 to extend an application (e.g., an existing or legacy application) and build new applications (e.g., target application). The CRA system makes building new COBOL functionality easy, enables the new COBOL functionality to be consistent, and makes the code interchangeable from one computing environment to another. The CRA system enables functionality to be easily reused between interactive types. Regardless of the interaction style (e.g., models MQ, CICS®, IMS™ and batch), the COBOL reference architecture provides an abstract layer that allows an application to be written once and deployed into multiple environments. The COBOL reference architecture provides components for each of the models (e.g., models MQ driver, CICS®, IMS™ and batch) to manage and process respective transformational issues so that the legacy application does not need to know anything about the model in which the legacy application interacts and/or is running under.

The CRA system manages interactions through various message interfaces (e.g., an MQ driver, a 3270® screen, and non-terminal attached transactions (e.g., web service or one transaction communicating with another transaction). The COBOL reference architecture interfaces (e.g., predefined configurations) manage the details of how the legacy application interacts in various models. The CRA system may be implemented using IBM® SYSTEM Z® mainframes.

The CRA system uses a transactional workflow driver (TWD) to provide one or more of a catalogue of components to satisfy (e.g., process) service request messages received and/or retrieved service request messages from various transaction servers and/or transaction managers. The TWD provides an interface to various transaction servers and/or transaction managers, in order to extend the functionality of legacy applications in multiple environments without modification to the legacy applications. The TWD receives a service request message from an interaction with a user by a transaction server (e.g., and/or transaction manager) such as a WEBSHERE® message queue (MQ) transaction server; a Customer Information Control System (CICS®) transaction server; Information Management System (IMS™) transaction server; and a batch transaction manager. The TWD processes service request messages for MQ Services®, 3270® terminal interface, non-terminal attached transactions (e.g., web service and/or one transaction communicating with another transaction), and batch transactions.

For example, a user may interact with an application implemented using a WebSphere message queue (MQ) (MQ driver 102) transaction server. The CRA system provides an application program interface (API) for MQ transaction servers (MQ service 104). When the MQ transaction server receives and/or retrieves a service request message (e.g., MQ Get Message) from a MQ queue using MQGet call 106, the transactional workflow driver (TWD), using a TWD call 108, executes one or more catalogued processing components to satisfy the service request message. The TWD returns a result (e.g., service request response message) and the result is returned using MQPut 110 to store the result (e.g., service request response) in the MQ queue.

In another example, the CRA provides an API for Customer Information Control System (CICS) transaction servers 112. When the CICS® transaction server 112 receives and/or retrieves a service request message (e.g., a CICS® request) from a 3270® terminal service 114 through a BMS® screen interface 116, the TWD, using a TWD call 118, executes one or more catalogued processing components to satisfy the service request message. The TWD returns a result (e.g., service request response) to the 3270® terminal service 114 through the BMS® screen interface 116. Basic Mapping Support (BMS®) is an API useable between CICS® applications and terminal devices (e.g., terminal services).

In still another example, the API for CICS transaction servers 112 receives and/or retrieves a service request message (e.g., a CICS request) stored in a common area from a non-terminal transaction 122 through a call to Get Common Area 124. The common area is one or more areas of computer memory that may be passed between applications (e.g., programs), for example, from a previous application (e.g., program) for one transaction (e.g., service request) to a subsequent application (e.g., program) for another transaction. The TWD, using a TWD call 126, executes one or more catalogued processing components to satisfy the service request message. The TWD returns a result (e.g., service request response) stored in the common area to the non-terminal transaction 122 through a call to Put Common Area 128.

The CRA provides an API for Information Management System (IMS™) transaction servers 130. When the IMS™ transaction server 130 receives and/or retrieves a service request message (e.g., an IMS™ request) from a 3270® terminal service 132 through a screen interface 134, the TWD, using a TWD call 136, executes one or more catalogued processing components to satisfy the service request message. The TWD returns a result (e.g., service request response) to the 3270® terminal service 132 through the screen interface 138.

The API for IMS™ transaction server 130 receives and/or retrieves a service request message (e.g., an IMS™ request) stored in the common area from a non-terminal transaction 140 through a call to Get Common Area 142. The common area is a single area that may be passed between programs and even from the last program of a transaction to the first program of the next transaction. The TWD, using a TWD call 144, executes one or more catalogued processing components to satisfy the service request message. The TWD returns a result (e.g., service request response) stored in the common area to the non-terminal transaction 140 through a call to Put Common Area 146.

In another example, the CRA provides an API for batch transactions 150. When the batch transaction manager 148 receives and/or retrieves a service request message (e.g., batch transaction request message) using open files connected to a database 152, the TWD, using a TWD call 154, executes one or more catalogued processing components to satisfy the service request message. The TWD returns a result (e.g., service request response) stored in the common area to the batch transaction through a call to Put Common Area 156.

Figure 2:
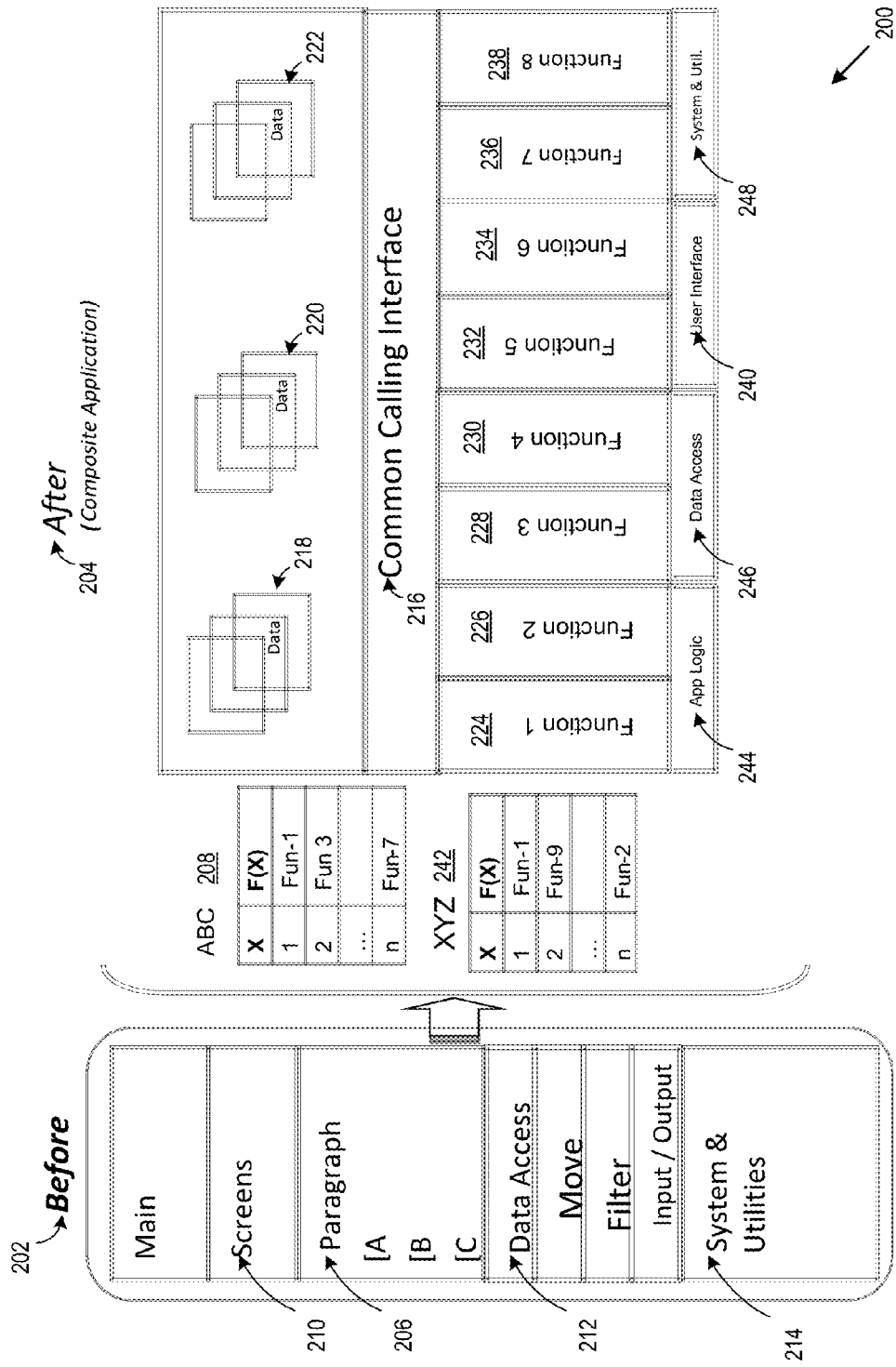
FIG. 2 shows how developing monolithic applications compare with developing composite applications using the CRA system.

FIG. 2 shows a comparison 200 of developing monolithic applications 202 to developing composite applications 204 using the CRA system. Using traditional application development methods, computing solutions are built top down (e.g., COBOL paragraphs 206 are coded without the flexibility to call or deploy the paragraphs 208 in different sequences), applications are written for specific user interaction (e.g., screens 210 and/or user interfaces), data sources 212 are not dynamic and systems and utilities 214 are hardcoded. In contrast, composite applications 204 built using the CRA system use a common calling interface 216 to access data (218, 220, 222) dynamically, functions (224, 226, 228, 230, 232, 234, 236, 238) are componentized so that various user interfaces 240 and interaction types (244, 246, 248) may access desired functions, and the componentized functionality may be arranged in various configurations 242 in order to deliver customized computing solutions without modifying legacy application components.

Figure 3:
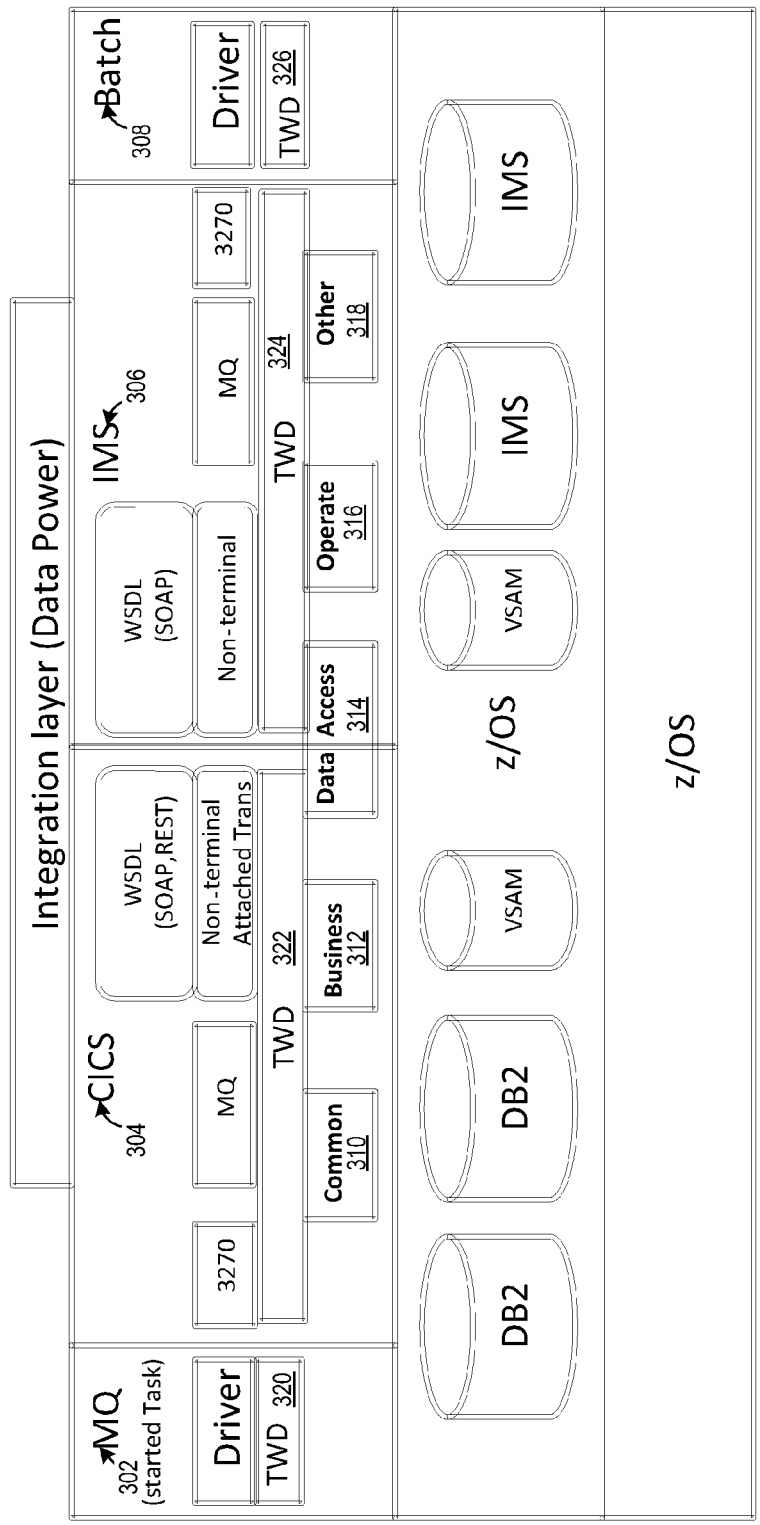
FIG. 3 shows capabilities written for different environments and a catalog of components provided by the transactional workflow driver (TWD).

FIG. 3 shows capabilities written for different environments (MQ 302, CICS® 304, IMS™ 306, Batch 308) and a catalog of components (310, 312, 314, 316, 318) provided by the transactional workflow driver (TWD) APIs (320, 322, 324, 326). The transactional workflow driver (TWD) provides a way to use capabilities written for different environments (e.g., driver programs) and common components 310 (e.g., utilities such as a date/time function, error logging), business components 312 (e.g., billing processes and interest rate calculation), data access components 314, operations components 316, and other components 318 and/or aspects to create computing solutions (e.g., extend existing applications). The TWD may use a catalogue of components to build computing solutions by dynamically combining the components of the catalogue in various ways. The application designer/developer may define the catalogue of components and the capabilities of the catalogue of components, including common components (e.g., utilities such as a date/time function, error logging), business components (e.g., billing processes and interest rate calculation), data access components, operations components, and other aspects to create computing solutions.

The catalogue of components provides functionality that may be utilized in accelerating the build of target applications. The CRA system catalogue of components may include caching services, codes table and code-decode services, configuration services, data services, error handling services, event notification services, exceptions, a factory framework, a file transfer helper, lifecycle management services, localization and internationalization (globalization) services, logging and audit tracing services, a mail helper, monitoring services, a queuing helper service, security services, a serialization service, service lookup and object finders, and thread management services.

The caching services provide a caching framework for storing data in memory for quick access. The caching services provide the ability to store results from a request locally, which avoids duplication of processing when an identical request is made subsequently. For example, caching services may cache web pages on a local Web Server that are commonly accessed by multiple users within a network, database prepared statements, servlets (e.g., a Java programming language class), and Java server pages (JSPs).

The codes table and code-decode services, also known as a codes table service, enables applications to utilize externally stored parameters and validation rules.

The configuration services defines a facility to manage configuration properties which enable applications to utilize externally stored parameters, including configuration of items such as database pools, database connections, source precedence rules, and logging options. Configuration facilities can enable the organization of application configuration through the use of domains and sub domains. Configuration services leverage underlying permanent data stores (e.g., relational database management systems (RDBMSs), directory servers, and flat files).

The data services enable the lower level access to and management of data required by the application. The error handling services support the handling of technical and/or functional fatal errors, non-fatal errors and warnings. The event notification services enable an application to autonomously notify users and/or other applications when certain conditions occur. Event notification services are used for various options of delivery, such as e-mail, instant messaging, and SMS for cell phones that are used to receive event notification.

The exceptions are a mechanism for dealing with errors. Unlike error codes returned by function calls, exceptions may have syntactic meaning. The exceptions may be thrown using a language keyword.

The factory framework provides a standard approach for instantiating system components through predefined look-up and creation mechanisms. A factory framework provides a way to create objects through a standard interface.

The file transfer helper is an interface or an abstraction layer that that provides a way to send and receive files using an underlying protocol such as file transfer protocol (FTP) or an application such as IBM® MQSERIES®.

The lifecycle management service manages and cleans up objects that are no longer useable or needed.

Globalization services include at least two areas including: Internationalization services and Localization services. Internationalization services provide flexibility to applications to manage international standards.

The logging and audit tracing services may permanently store application information in a data store that can be accessed for operations management. Logging includes alerting, logging, tracing.

The mail helper is an interface configured to send mail across the internet using a mail protocol (e.g., the Simple Mail Transfer Protocol (SMTP) which is usually used with one of two other protocols, POP3 or Internet Message Access Protocol, for queuing messages in a server mailbox and downloading them periodically from a server).

The monitoring services track run-time information about the application.

The queuing helper service is an abstraction layer for message queuing APIs. The queuing helper service hides underlying details about the API calls from the user to simplify the interface and improve maintainability.

The security services may be re-useable common security architecture components that are documented and packaged to facilitate easy re-deployment. The security services provide consistency and standardization across the enterprise for common security functions such as authentication, encryption, and non-repudiation.

The serialization service encapsulates a process where an object and/or data are converted to text streams and/or files and vice-versa, so that the object and/or data may be stored and/or transported.

The service lookup and object finders provide naming and directory services to help directory-enabled applications find specific objects on a network.

The thread management services support the use of multi-threading in applications. Using threads in graphical user interface (GUI) applications enables the user interface to be more responsive to the user (e.g., as opposed to appearing to have frozen). Thread Management helps applications keep threads from interfering with each other, locking shared data structures and controlling access to the shared data structures.

The CRA system catalog of components (processing component) may also include validation services that include validation of date and time, number, character, social security number and/or social insurance number (SSN/SIN), and other components for rounding, send mail, send file, get file, and parsing.

The CRA system translates a pictorial representation (e.g., application flow) of a target application into a computer readable format (e.g., TWD vector array). The translated pictorial representations (e.g., application flow) of target applications may be used to extend the catalog of functionality. Each TWD processing component may be a TWD vector.

Figure 4:
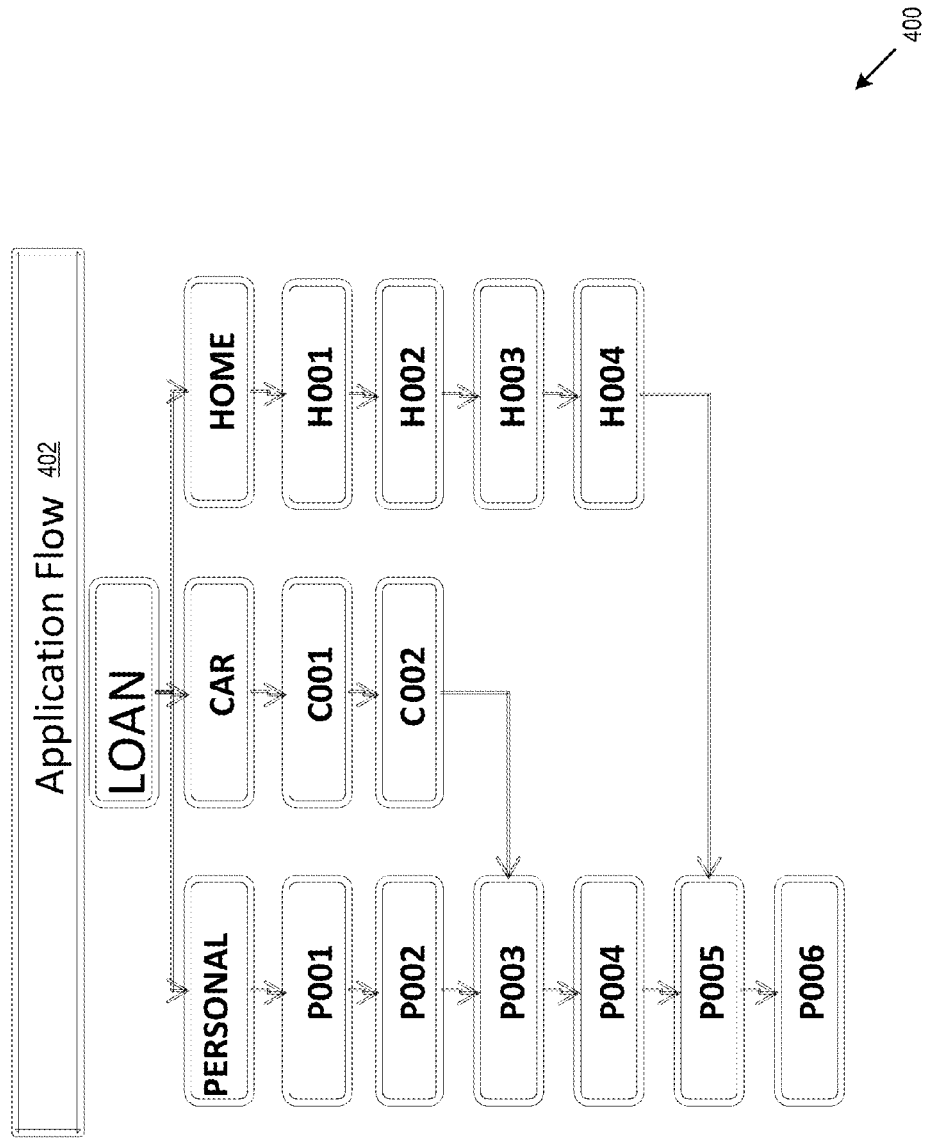
FIG. 4 shows an application flow graphical representation area provided by the TWD.

FIG. 4 shows an application flow graphical representation area 400 provided by the TWD. The TWD is a framework that combines COBOL modules, manages the interactions of the COBOL modules and enables the easy use of a common catalog of functionality. The CRA system and/or TWD canvas generates a vector that translates a graphical representation of an application flow 402 into a computer readable format. The TWD allows a developer to create a catalog of processing components. The TWD includes an application flow graphical representation area, an array (vector) that depicts the application flow, and an engine (see Table 1) that processes the interaction array (TWD vector). Application logic for a legacy application may be drawn out in simple flows and/or trees. The TWD allows an application designer to identify functionality required to perform an activity and identify the order in which the functionality is called (e.g., executed). The TWD flow may be translated directly into a dynamic call tree/workflow. A designer (e.g., application developer) defines with as much detail as desired the capabilities and sequence of a catalogue of components to execute to deliver a computing solution.

Figure 5:
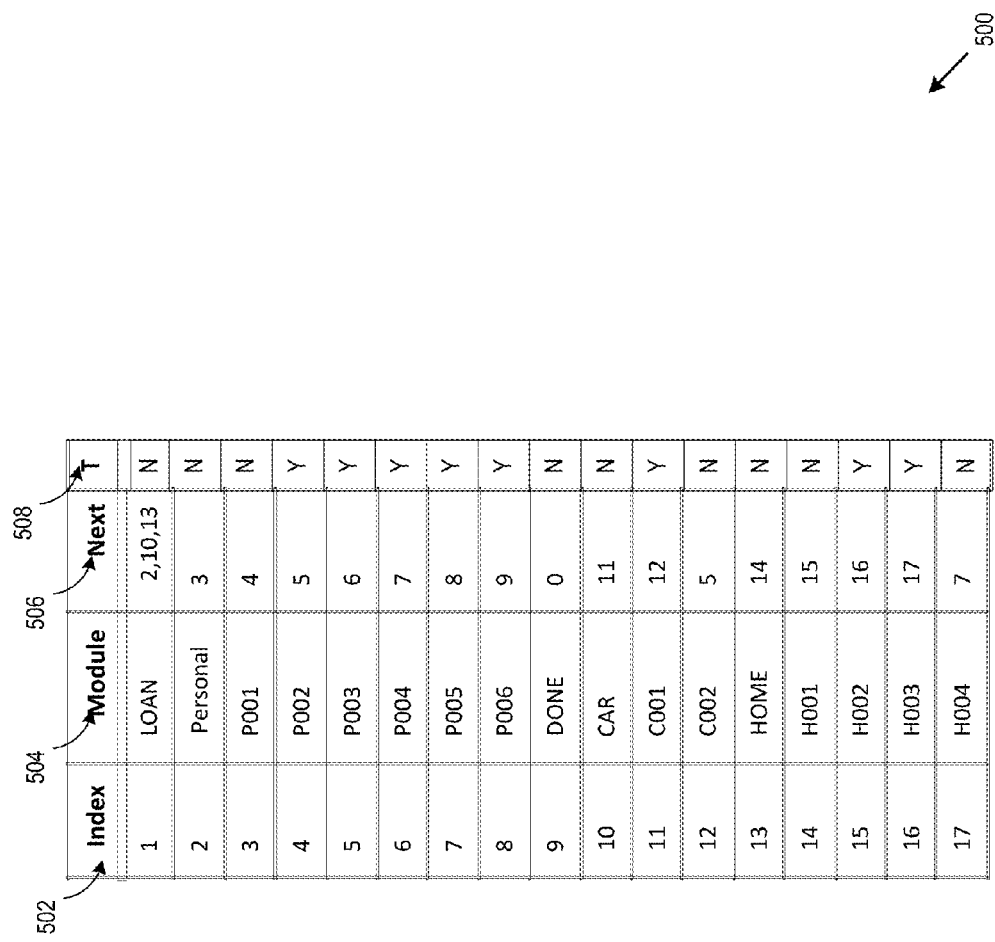
FIG. 5 shows a TWD array (vector) that depicts the application flow for an application.

FIG. 5 shows a TWD array (vector) 500 that depicts the application flow 402 for an application. The TWD translates the application flow into a TWD vector that can be stored within a database and/or within an application. Storing the application flow in a database and/or properties files provides the legacy application dynamic flows, and provides minimal overhead. The TWD vector 500 translates the application components identified by the application flow 402 into modules 504, assigned to indexes 502, and provide conditional processing control based on return codes 506 returned by each module. The TWD vectors provide an organization a way to deploy components dynamically without modifying legacy applications.

For example, an organization may use a central processing environment for multiple states and/or countries, and deploy respective TWD vectors may provide processing components for different capabilities, such as tax rules for different states and/or countries (e.g., geographical locations). In order to change the processing components the TWD merely changes the vector used so that the legacy application does not need to be recoded (e.g., programmed). Each of the TWD processing components is atomic (e.g., function independent of TWD processing components). Whether a TWD processing component exists or is created depends on the existing capabilities of the legacy application. For example, a legacy application (e.g., an application to be used with TWD processing components) may include the functionality to perform personal and home loan origination and processing, but not include car loan origination and processing functionality. Accordingly, the TWD processing components to perform loan origination and processing functionality may be developed or selected from a repository of existing TWD processing components. In this way, the legacy application does not have to be modified to perform the functions provided by the TWD processing components.

Table 1 shows TWD vector processing code that may be used to process an application workflow in real-time from a COBOL array (TWD vector). The sample TWD vector processing code represents the processing performed by a TWD vector, because the TWD vector is self-describing (e.g., the TWD vector identifies the sequence of execution of the TWD processing components, including conditional processing. See FIG. 5 index 1, based on a return code vector processing goes to index 2, 10, or 13).

TABLE 1

TWD vector processing Engine

Figure 6:
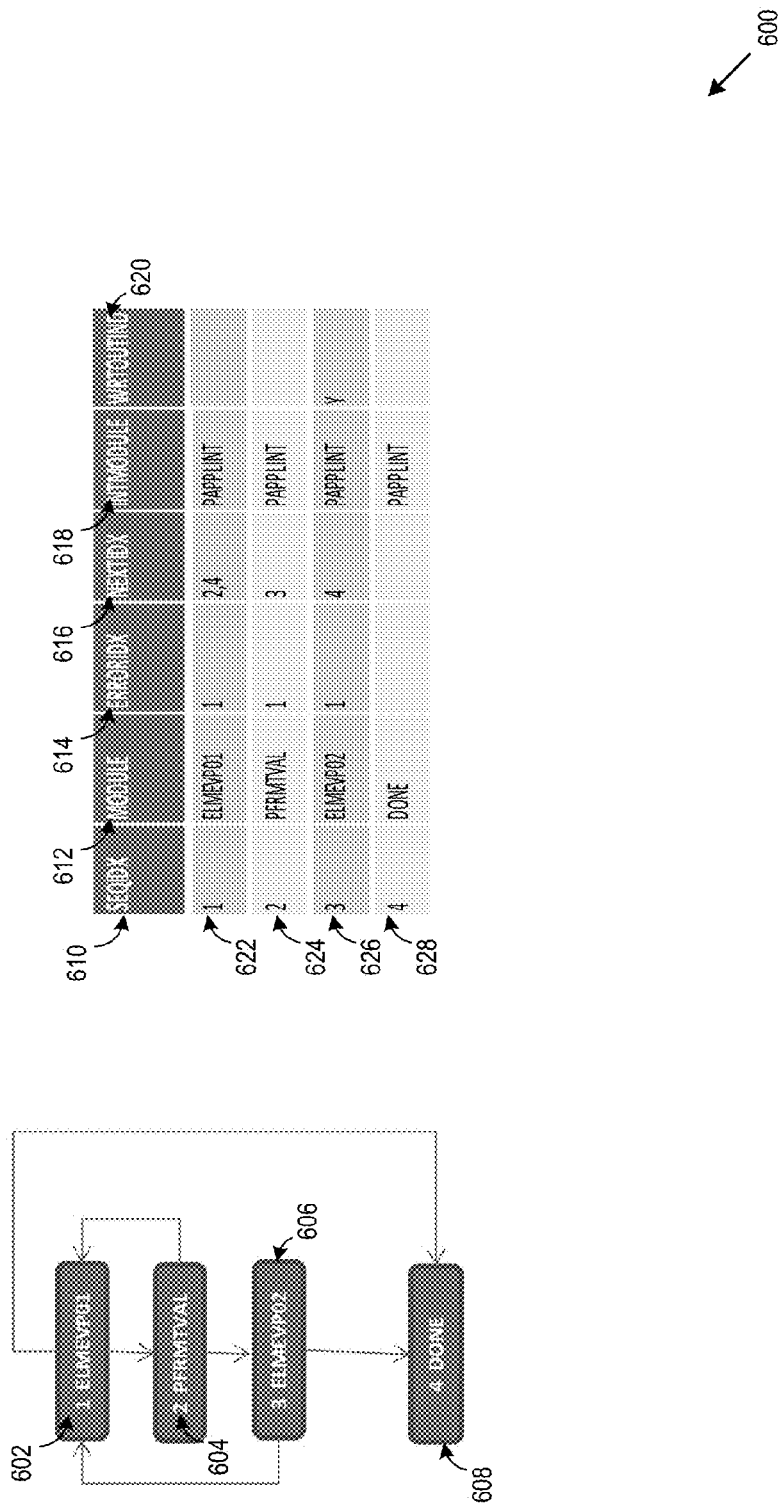
FIG. 6 shows a decision matrix table translation that depicts a TWD application flow as a decision matrix table.

While f(x,1) !=DONE
    CALL f(x,1) using GM by reference
    RC = RETURN CODE
    CALL GET_NEXT USING RC, f(x,2)
    X = RETURN CODE
END WHILE FIG. 6 shows a decision matrix table translation 600 that depicts a TWD application flow (602, 604, 606, 608) as a decision matrix table (610, 612, 614, 616, 618, 620). The TWD provides a framework to combine COBOL modules (e.g., processing components) together, manage the interactions of the processing components, and enable the use of a common catalog of functionality (e.g., processing components that extend the functionality of legacy applications). The TWD array depicts the application flow as fetched by the data layer module (TWDDLP01). TWDDLP01 fetches the decision matrix table into an array which is indexed by SEQIDX 610 for a given application id (module 614), operation code and channel (e.g., MQ, CICS®, IMS™ and batch). SEQIDX 610 is the sequence index of the module rendering functionality in the TWD application flow which also doubles as program index. MODULE 612 stores the module name associated with the SEQIDX 610 which renders a specific function. ERRORIDX 614 is the list of common separated SEQIDXs for error work flow where in the first value has the SEQIDX (622, 624, 626, 628) of the subsequent module called when the RETURN-CODE from Module 612 is −1. NEXTIDX 616 is the list of common separated SEQIDXs for positive work flow (non-negative return code values) where in the first value has the SEQIDX of the subsequent module called when the RETURN-CODE from Module 612 is 1, (where in the second value has the SEQIDX of the subsequent module called when the RETURN-CODE from Module 612 is 2). INTMODULE 618 stores the name of the interfacing module (e.g., PAPPLINT) that populates the data as required from the next module to be called. The TWO uses a parse program to get the next program index (NEXTIDX 616) PAPPLINT module to populate the resultant output of the previous module to the next module to be called. PAPPLINT is a transaction specific program which may receive the Admin parm, Pparminpinput and Pparmout-out as the parameters. The program populates the input area of the next to be called program from Pparminp-input. PAPPLINT also stores the data of the output of the previously called program in the Pparmoutoutput. WRTOUTIND 620 indicates whether or not (e.g., a value of 'Y') the INTMODULE 618 should write the result into output copybook.

Table 2 shows an interaction array processing engine that processes the interaction array (TWD vector). The TWD (e.g., at runtime) uses the module name to call the module. The module returns a return code that the TWD analyzes. The TWD performs actions responsive to the return code. For example, when the return code is positive and/or not zero the TWD parses the return code. In the event the return code is negative, then the TWD will perform error processing according and/or responsive to the return code. In the event the return code is zero, then the TWD processes the next module. In the event the return code is positive, then the TWD processes the next module. The return code is an encoding of a condition statement used to process the TWD vector.

The function of each module (e.g., processing component) defined in the TWD vector may be atomic (e.g., discrete computing logic) so that various permutations of modules may be arranged in combination. The TWD identifies (e.g., at runtime) the data needed (e.g., a copybook of metadata) for the processing components (module) and passes the address of the copybook to the linkage section that describes data made available from another program (e.g., the processing components-module). For example, a developer defines at design time the data desired and at runtime the TWD determines the data to deliver to each module (e.g., processing components).

TABLE 2

An Interaction Array Processing Engine

Figure 7:
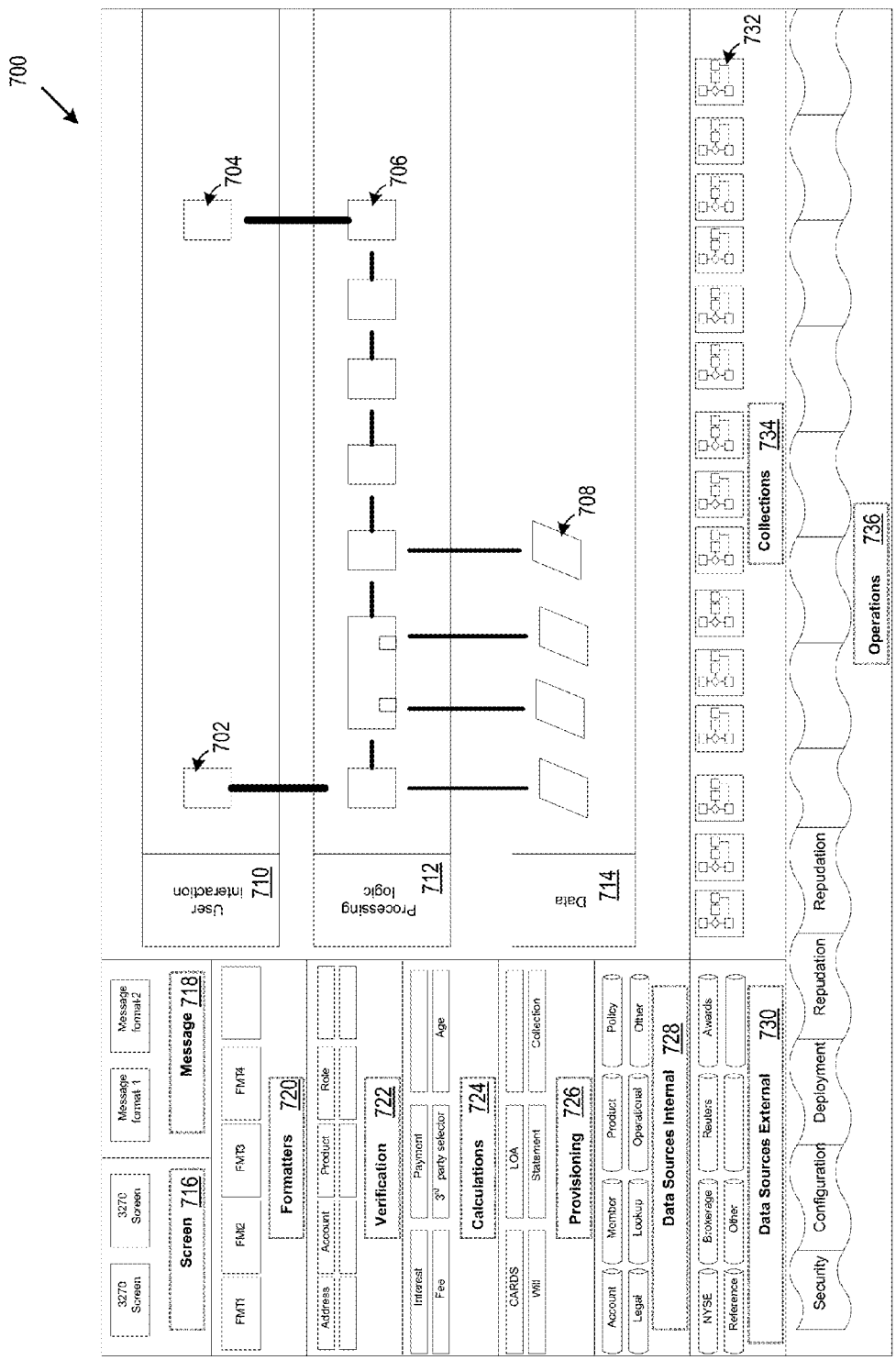
FIG. 7 shows a designer canvas used to graphically build a TWD vector.

While MODULE(SEQIDX) !=DONE
    CALL MODULE(SEQIDX)
    using Generic input returning RC.
    RC = MOD-RC (Module return code)
    CALL 'PAPPLINT' using Generic input ,Generic output returning RC.
    RC = RETURN CODE
    Check whether positive or negative MOD-RC
    CALL PPARSE using NEXTIDX or ERRORIDX returning
PARSE(IDX) array.
     SET IDX to MOD-RC
    Get next Program ID i.e.
     PARSE (IDX) = SEQIDX
END WHILE FIG. 7 shows a designer canvas 700 used to graphically build a TWD vector. An application designer/developer may build a TWD vector by drag-and-dropping graphical representations of user interactions (702, 704), processing logic (706) and data (708) onto designated areas of the canvas (e.g., user interactions area 710, processing logic area 712 and data area 714). The canvas 700 may include further granularly designated areas on which to place objects representing application processing. The application designer/developer may select various processing components, including the interaction/interface (screen 716, message 718), data and message formatting functionality (formatters 720), verification functionality 722 (e.g., for verification of address, account, product, role), calculations 724 (e.g., interest, payment amount and/or type, fee, third party selector, age), provisioning functionality 726 (cards, LOA, will, statement, collection), data sources internal 728 (e.g., account, member, product, policy, legal, lookup, and operational) and data sources external 730 (e.g., NYSE, brokerage, Reuters, awards, reference). The application designer/developer may select various preconfigured execution patterns 732 from collections 734 of preconfigured execution patterns. The designer canvas 700 may present a visualization of the TWD vector as a sequence of operations 736. The designer canvas 700 may also be used to identify missing processing components and requirements for a target application by determining the process components that do not exist in the catalogue of components.

Figure 8:
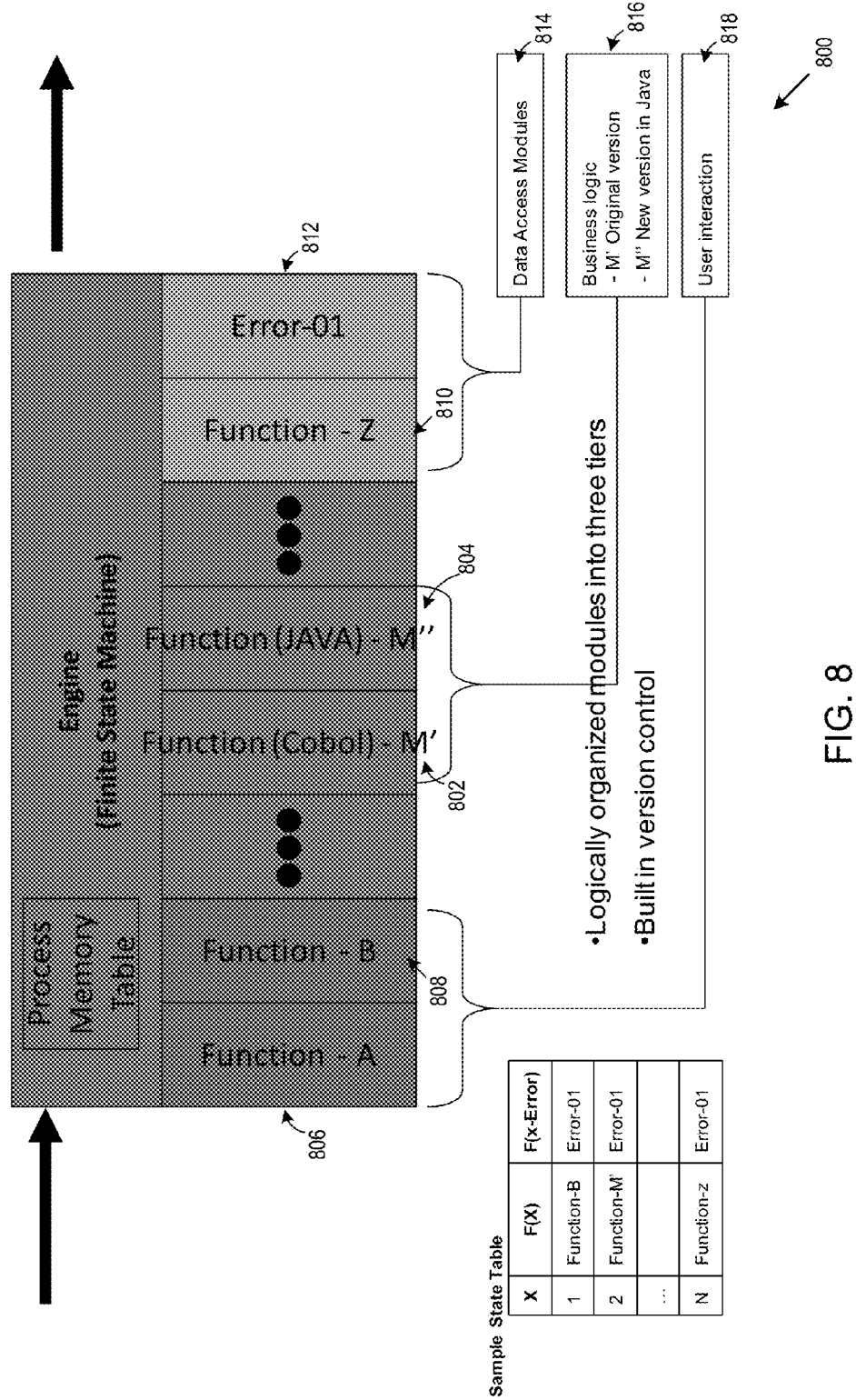
FIG. 8 shows a rollback feature provided by the TWD.

FIG. 8 shows a rollback feature 800 provided by the TWD. The TWD provides the rollback feature 800 so that one TWD vector (e.g., a TWD vector that calls Function (COBOL)-M' 802) may be redeployed over another TWD vector (e.g., a TWD vector that calls Function (COBOL)-M" 804). Each node (processing component) (802, 804, 806, 808, 810, 812) of a TWD vector represents an atomic operation of one or more versions and/or options (variations) of functionality (e.g., data access modules 814, business logic 816, user interactions 818).

FIG. 9 shows another decision matrix table 900. The decision matrix table may also include APPLID 902 that identifies the application name, OPERCODE 904 that identifies the unique name of the service or transaction being rendered, and CHANNEL 906 that identifies the environment (e.g., MO, CICS®, IMS™, batch).

Figure 10:
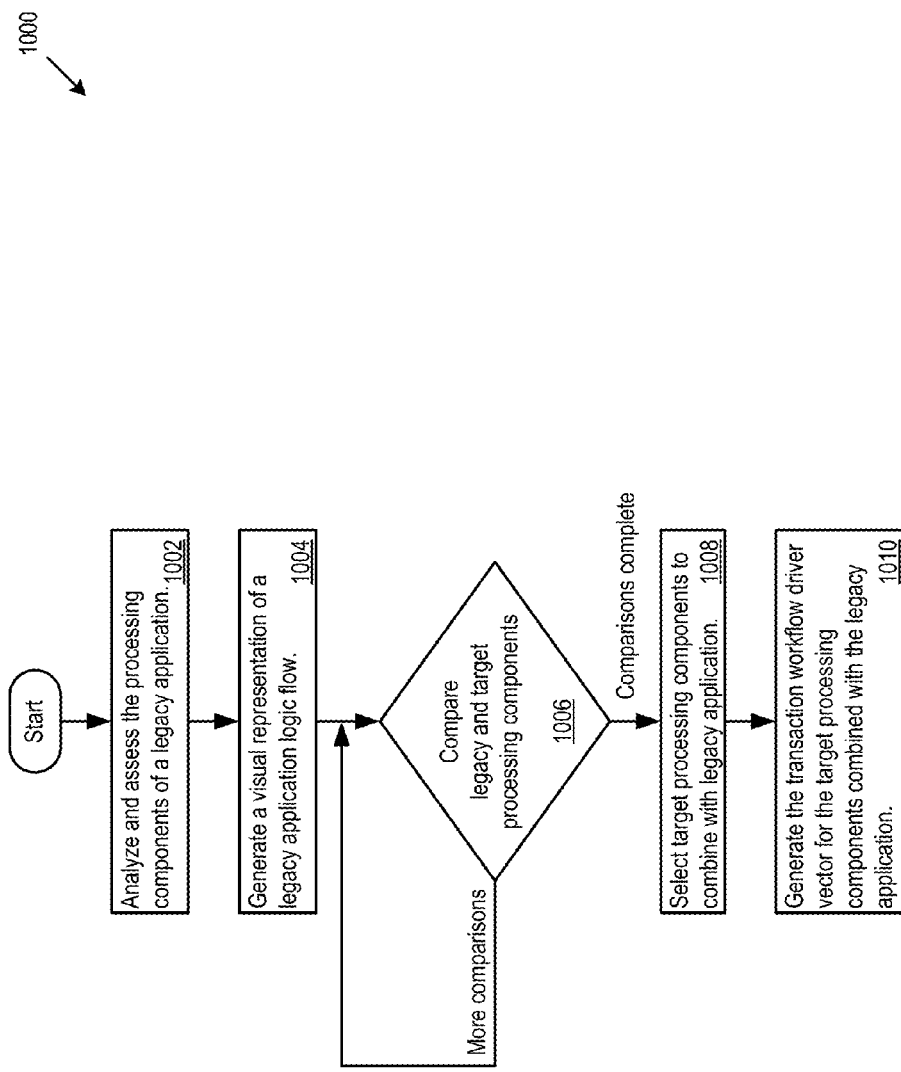
FIG. 10 shows a logic flow the CRA system may use to generate a TWD vector.

FIG. 10 shows a logic flow 1000 the CRA system may use to generate a TWD vector. The TWD may perform an automated analysis and assessment of the legacy application to determine (identify) gaps in functionality that the TWD processing components will provide in order to satisfy the target application requirements. The TWD system may perform an automated analysis and assessment of the legacy application by using structured comments that identify the functions of existing components of the legacy application (1002). For example, the TWD system may use a tool similar to Javadoc documentation generator to generate API documentation HTML format from Java source code (e.g., modifying Javadoc to handle structured comments). The TWD identifies (and models) the legacy application execution patterns defined by the legacy application processing components. The application designer/developer may use the TWD to build a visual representation of the application logic flow for a legacy application (1004). The TWD identifies legacy application processing components and legacy application execution patterns from the visual representation of the legacy application. The TWD identifies (and models) the TWD processing components to combine with the legacy application in order to result in a target application (e.g., enhanced functionality), addressing gaps in the functionality of the legacy application without modifying the legacy application, combining the functionality of the TWD processing components (1006).

The TWD presents for selection (e.g., user or automated selection) a visual representation of extender processing components and identifies, by comparing the legacy application processing components with the target application (e.g., features and enhancements unavailable in the legacy application), one or more extender processing components from the visual representation of the extender processing components that extend the legacy application (1008). The user and/or the TWD select the one or more extender processing components from an extender processing components repository (e.g., one or more files, databases and/or computer memories). The TWD generates the desired target application and extender execution patterns defined by the extender processing components. The user and/or the TWD order into an execution sequence the one or more extender processing components and the legacy application execution patterns. The TWD generates and stores, in a memory coupled to a processor, the target application processing vector that represents the ordering of the legacy application execution patterns with the extender execution patterns. The TWD generates the target application processing vector by translating the legacy application processing components and the one or more extender processing components into a target execution pattern (1010).

Figure 11:
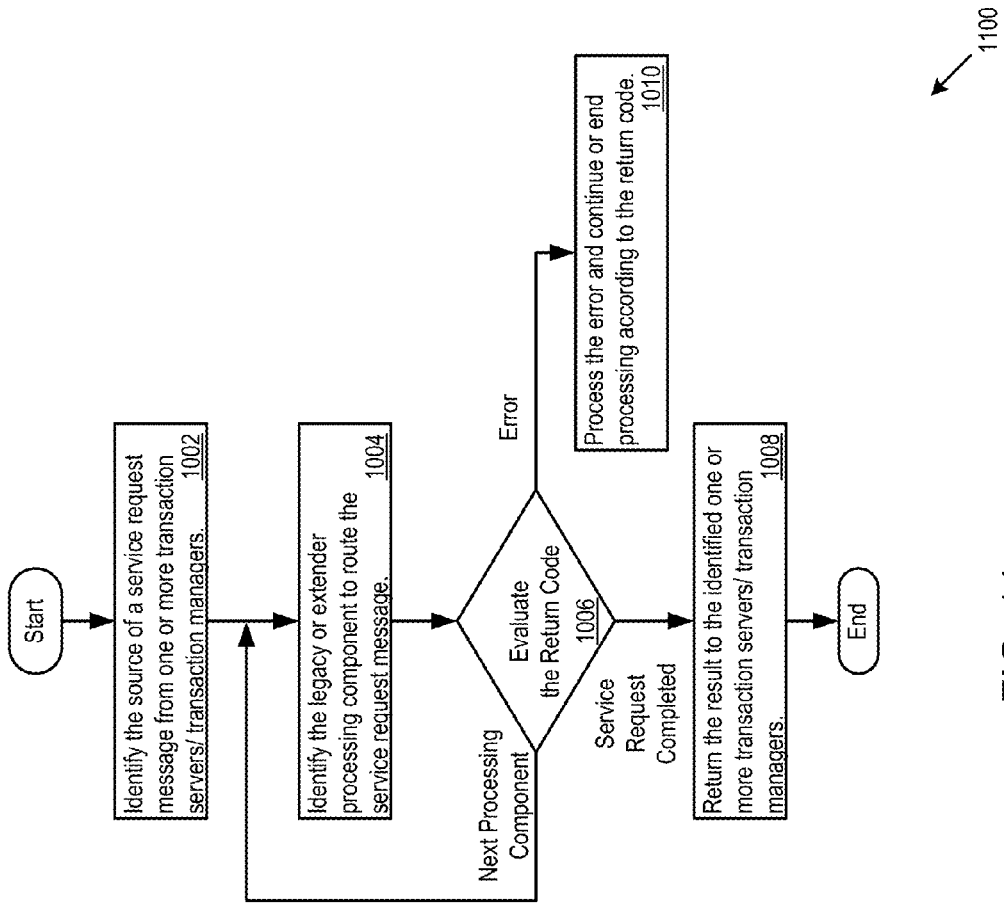
FIG. 11 shows a logic flow the CRA system may use to process a user interaction with a deployed TWD vector.

FIG. 11 shows a logic flow 1100 the CRA system may use to process a user interaction with a deployed TWD vector. The TWD executes, using the processor, the target application processing vector to perform features defined by the target execution pattern. The CRA system and/or the TWD deploy the target application with one or more service request message application program interfaces (APIs) for one or more transaction servers and/or transaction managers (1102). The transaction servers and/or transaction managers may include: a WebSphere message queue (MQ) transaction server; a Customer Information Control System (CICS) transaction server; an Information Management System (IMS) transaction server; and a batch transaction manager. The TWD manages user interactions with the target application, using the one or more service request message APIs to satisfy service request messages responsive to the user interactions.

The CRA system and/or the TWD receive a user interaction for the target application through the one or more service request message APIs, translates the user interaction into a target application service request message for the target application processing vector component associated with the legacy application processing components and the one or more extender processing components, and identifies which of the legacy application processing components or the one or more extender processing components to which to communicate the target application service request message.

The TWD communicates the target application service request message to the identified legacy application processing component or the identified one or more extender processing component, executes the identified legacy application processing component or the identified one or more extender processing component responsive to the target application service request message (1104), and receives a return code from the identified legacy application processing component or the identified one or more extender processing component. The CRA system and/or the TWD determine whether the return code includes: a result, error code, or a subsequent processing component reference to another legacy application processing component or another one or more extender processing component (1006, 1008, 1010).

The target application processing vector defines the target application logic flow, and branching and conditional logic for the target application. The TWD provides branching and conditional logic so that a target application may be defined by a single TWD vector. The TWD branching and conditional logic may be used, for example, to perform field validation allowing the TWD to call a module (processing component)

repeatedly and use different data (e.g., defined at runtime) with the module (e.g., validating multiple account numbers where each account is validated based on different criteria such as state taxes, postal codes or country codes).

The target application processing vector defines functions that may run in parallel by evaluating a parallel processing variable (attribute for example with a value of 'Y' or 'N', see FIG. 5 column 'T' 508) that indicates whether to execute a processing component. When the parallel processing variable indicates a processing component may be executed in parallel, the TWD creates a thread for the processing component and calls (executes) the processing component. The TWD evaluates the parallel processing variable for each successive processing component and creates a processing thread for each the processing components and calls (executes) the respective processing component. When the TWD evaluates the parallel processing variable of a successive processing component as non-parallel (e.g., attribute value of 'N'), the TWD waits for the one or more threads to compete (e.g., when a counting semaphore equals zero) before calling the non-parallel processing component (e.g., using the counting semaphore to track how many threads are running). The TWD also may evaluate the return codes of each processed component before calling the non-parallel processing component. The TWD increases the counting semaphore for each thread created and decrements for each thread that completes. The TWD may automatically analyze the processing components of the target application and identify those processing components that the TWD may execute in parallel.

Table 3 shows TWD vector processing code that may be used to process an application workflow in real-time from a COBOL array (TWD vector) with thread logic to process vector components in parallel. The TWD vector identifies the sequence of execution of the TWD processing components, including conditional processing. See FIG. 5 column CT' 508 values 'Y' for yes to create a thread and 'N' not to create a thread).

TABLE 3

TWD vector processing Engine with Thread Logic

```
While f(x,1) !=DONE
    CALL f(x,1) using GM by reference
    RC = RETURN CODE
    If thread then
       Create thread with GET_NEXT UING RC, f(x,2)
    else
       wait for all thread to complete
    CALL GET_NEXT USING RC, f(x,2)
    X = RETURN CODE
END WHILE
```

When the return code includes a result, the CRA system and/or the TWD communicate the return code in a service request response message through the one or more service request message APIs to the user. When the target application service request message is a MQ Get Message from a MQ queue, the CRA system and/or the TWD receive the target application service request message using a MQGet call, and store the result in a service request response message in the MQ queue by communicating the service request response message using a MQPut call.

When the target application service request message is a CICS request from a 3270® terminal service, the CRA system and/or the TWD receive the target application service request message using a Basic Mapping Support (BMS®) screen interface, and communicate the result in a service request response message to the 3270 terminal service using the BMS screen interface.

When the target application service request message is a CICS® request or an IMS™ request from a non-terminal transaction, the target application service request message is stored in a common area. The CRA system and/or the TWD receive the target application service request message using a call to get the common area. The common area is one or more areas of computer memory passed between one or more applications, including the target application and the non-terminal transaction. The CRA system and/or the TWD communicate the result in a service request response message to the non-terminal transaction by storing the service request response message in the common area using a call to put common area.

When the target application service request message is a IMS request from a 3270® terminal service, the CRA system and/or the TWD receive the target application service request message using a screen interface, and communicate the result in a service request response message to the 3270 terminal service using the screen interface.

When the target application service request message is a batch job that requests messages from a batch process, the CRA system and/or the TWD receive the target application service request message using open files connected to a database, and responds with messages to the batch process. The CRA system and/or the TWD store the target application service request message in the open files connected to the database, and communicate responses in service request response messages to the batch process. The service request response messages may be stored in a common area using a call to put common area.

Figure 12:
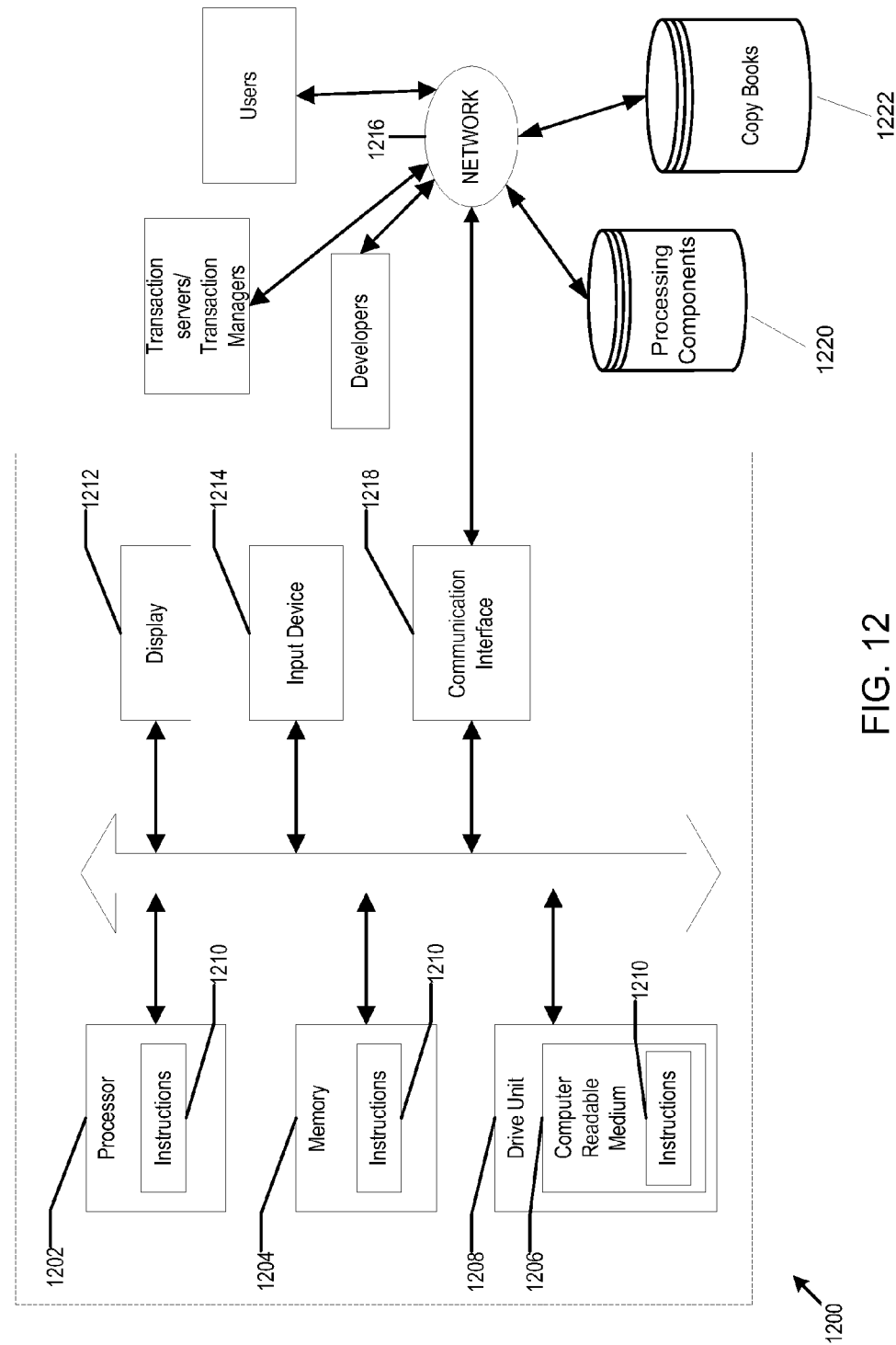
FIG. 12 shows a CRA system configuration that includes the CRA system.

FIG. 12 shows a CRA system configuration 1200 that includes the CRA system. The system may be deployed as a general computer system used in a networked deployment. The computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1210 (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a processor 1202, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories discussed herein, as well as the claims below, may be embodied in and implemented in one or multiple physical chips or circuit combinations. The processor may execute a software program, such as code generated manually (i.e., programmed).

The computer system may include a memory 1204 that can communicate via a bus. The memory may be a main memory, a static memory, or a dynamic memory. The memory may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the memory, or other memory. The memory may be an external storage device or database for storing data processing components 1220 and copy books 1222). Examples may include a hard drive, compact disc ("CD"), digital video disc ("DVD"), memory card, memory stick, floppy disc, universal serial bus ("USB") memory device, or any other device operative to store data. The memory may be operable to store instructions executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display 1212, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit.

Additionally, the computer system may include an input device 1214 configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit 1208. The disk drive unit may include a computer-readable medium 1206 in which one or more sets of instructions (e.g., software) can be embedded. Further, the instructions may perform one or more of the methods or logic as described herein. The instructions may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal, so that a device connected to a network 1216 may communicate voice, video, audio, images or any other data over the network. Further, the instructions may be transmitted or received over the network via a communication interface 1218. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the system may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed:

1. A method, the method comprising:
   presenting, using a user interface, in a transactional workflow driver (TWD), a visual representation of a legacy application;
   identifying, using the TWD, from the visual representation of the legacy application, legacy application processing components and legacy application execution patterns;
   presenting, using the TWD, a visual representation of extender processing components;
   identifying, using the TWD, by comparing the legacy application processing components with requirements for a target application, one or more extender processing components from the visual representation of the extender processing components that extend the legacy application to generate:
      the target application; and
      extender execution patterns defined by the extender processing components;
   selecting the one or more extender processing components from an extender processing components repository;
   ordering into an execution sequence the one or more extender processing components and the legacy application execution patterns;
   generating and storing, in a memory coupled to a processor, a target application processing vector that represents the ordering of the legacy application execution patterns with the extender execution patterns;
   executing, using the processor, the target application processing vector to perform features defined by a target execution pattern;
   deploying the target application with one or more service request message application program interfaces (APIs) for one or more transaction servers or transaction managers;
   managing user interactions with the target application, using the one or more service request message APIs to satisfy service request messages responsive to the user interactions;
   receiving, using the TWD, a user interaction for the target application through the one or more service request message APIs;
   translating, using the TWD, the user interaction into a target application service request message for the target application processing vector associated with the legacy application processing components and the one or more extender processing components;
   identifying, using the TWD, which of the legacy application processing components or the one or more extender processing components to which to communicate the target application service request message; and
   communicating, using the TWD, the target application service request message to the identified legacy application processing component or the identified one or more extender processing component;
   executing, using the TWD, the identified legacy application processing component or the identified one or more extender processing component responsive to the target application service request message;
   receiving, using the TWD, a return code from the identified legacy application processing component or the identified one or more extender processing component;
   determining, using the TWD, whether the return code includes:
      a result; or
      a subsequent processing component reference to another legacy application processing component or another one or more extender processing component; and
   in instances when the return code includes the result, communicating, using the TWD, the return code in a service request response message through the one or more service request message APIs to a user.

2. The method of claim 1, wherein the legacy application execution patterns are defined by the legacy application processing components.

3. The method of claim 1, wherein generating the target application processing vector comprises: translating the legacy application processing components and the one or more extender processing components into the target execution pattern.

4. The method of claim 1, wherein the target application service request message is a Get Message from a queue, the method further comprising:
   receiving the target application service request message using a Get call; and
   storing the result in the service request response message in the queue;
   communicating, based on the Get call, the service request response message using a Put call.

5. The method of claim 1, wherein the target application service request message is a request from a terminal service, the method further comprising:
receiving the target application service request message using a screen interface; and
communicating the result in the service request response message to the terminal service using the screen interface.

6. The method of claim 1, wherein the target application service request message is a request from a non-terminal transaction, and wherein the target application service request message is stored in a common area, the method further comprising:
receiving the target application service request message using a call to get the common area, wherein the common area is one or more areas of computer memory passed between one or more applications, including the target application and the nonterminal transaction; and
communicating the result in the service request response message to the nonterminal transaction by storing the service request response message in the common area using a call to put common area.

7. The method of claim 1, wherein the target application service request message is a request from a terminal service, the method further comprising:
receiving the target application service request message using a screen interface; and
communicating the result in the service request response message to the terminal service using the screen interface.

8. The method of claim 1, wherein the target application service request message is a batch transaction request message from a batch transaction, the method further comprising:
receiving the target application service request message by the TWD using open files connected to a database, wherein the target application service request message is stored in the open files connected to the database; and
communicating the result in the service request response message to the batch transaction by storing the service request response message in a common area using a call to put common area, wherein the common area is one or more areas of computer memory passed between one or more applications, including the target application and the a non-terminal transaction.

9. A system, the system comprising:
a user interface operable to present a visual representation of a legacy application;
a memory coupled to a processor, the memory comprising:
a transactional workflow driver (TWD) operable to:
generate a visual representation of the legacy application;
identify from the visual representation of the legacy application, legacy application processing components and legacy application execution patterns;
present a visual representation of extender processing components;
identify, by comparing the legacy application processing components with requirements for a target application, one or more extender processing components from the visual representation of the extender processing components, wherein the one or more extender processing components extend the legacy application;
generate the target application and extender execution patterns defined by the extender processing components;
select the one or more extender processing components from a extender processing components repository;
order into an execution sequence the one or more extender processing components and the legacy application execution patterns;
generate and store, in the memory, a target application processing vector that represents the ordering of the legacy application execution patterns with the extender execution patterns; and
execute, using the processor, the target application processing vector to perform features defined by a target execution pattern;
one or more service request message application program interfaces (APIs) for one or more transaction servers or transaction managers, wherein the one or more service request message APIs are operable to deploy the target application, the transaction servers or transaction managers;
wherein the TWD is further operable to:
manage user interactions with the target application, using the one or more service request message APIs to satisfy service request messages responsive to the user interactions;
receive a user interaction for the target application through the one or more service request message APIs;
translate the user interaction into a target application service request message for the target application processing vector associated with the legacy application processing components and the one or more extender processing components;
identify which of the legacy application processing components or the one or more extender processing components to which to communicate the target application service request message;
communicate the target application service request message to the identified legacy application processing component or the identified one or more extender processing component;
execute the identified legacy application processing component or the identified one or more extender processing component responsive to the target application service request message;
receive a return code from the identified legacy application processing component or the identified one or more extender processing component;
determine whether the return code includes:
a result: or
a subsequent processing component reference to another legacy application processing component or another one or more extender processing component; and
in instances when the return code includes the result, communicate the return code in a service request response message through the one or more service request message APIs to a user.

10. The system of claim 9, wherein the legacy application execution patterns are defined by the legacy application processing components.

11. The system of claim 9, wherein the TWD is further operable to:
translate the legacy application processing components and the one or more extender processing components into the target execution pattern.

12. The system of claim 9, wherein the target application service request message is a Get Message from a queue, wherein the TWD is further operable to:
   receive the target application service request message using a Get call; and
   store the result in the service request response message in the queue;
   communicate, based on the Get call, the service request response message using a Put call.

13. The system of claim 9, wherein the target application service request message is a request from a terminal service, the system further comprising:
   a screen interface operable to receive the target application service request message, wherein the TWD is further operable to communicate the result in the service request response message to the terminal service using the screen interface.

14. The system of claim 9, wherein the target application service request message is a request or a request from a non-terminal transaction, the system further comprising:
   a common area comprising the target application service request message,
   wherein the common area is one or more areas of computer memory passed between one or more applications, including the target application and the non-terminal transaction,
   wherein the result in the service request response message is communicated to the non-terminal transaction by storing the service request response message in the common area.

15. The system of claim 9, wherein the target application service request message is a request from a terminal service, the system further comprising:
   a screen interface operable to receive the target application service request message using, wherein the screen interface communicates the result in the service request response message to the terminal service.

16. The system of claim 9, wherein the target application service request message is a batch transaction request message from a batch transaction, the system further comprising:
   open files connected to a database, wherein the open files are operable to receive the target application service request message; and
   a common area comprising the service request response message comprising the result to the batch transaction, wherein the common area is one or more areas of computer memory passed between one or more applications, including the target application and a non-terminal transaction.

* * * * *